Patented July 17, 1951

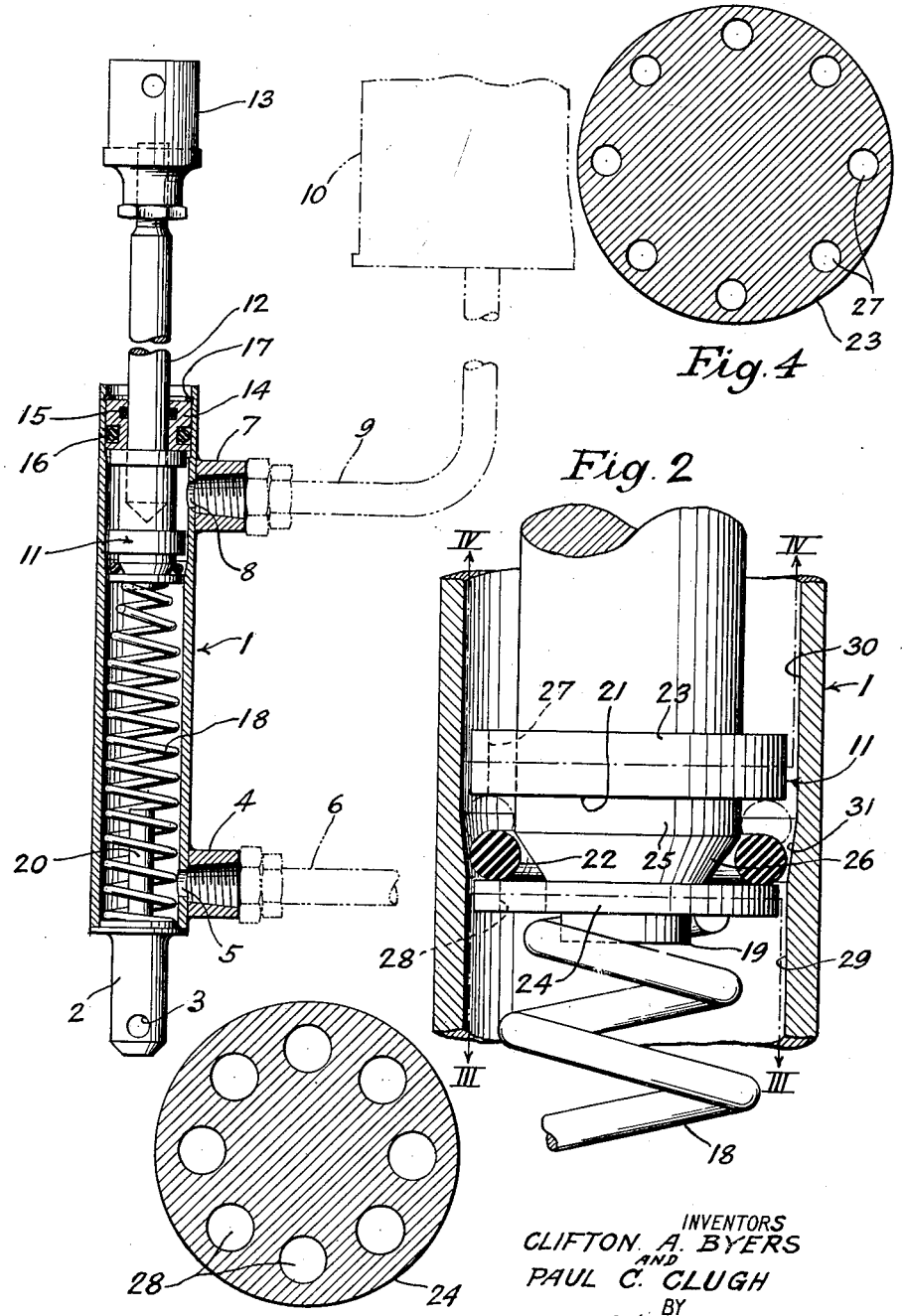

2,561,009

UNITED STATES PATENT OFFICE 2,561,009

HYDRAULIC BRAKE MASTER CYLINDER

Clifton A. Byers and Paul C. Clugh, Cuyahoga Falls, Ohio, assignors to Wingfoot Corporation, Akron, Ohio, a corporation of Delaware Application October 29, 1947, Serial No. 782,934

9 Claims. (Cl. 60—54.6)

This invention relates to piston and cylinder combinations, and, more particularly, is concerned with master cylinder constructions for use with hydraulic brake systems.

Heretofore, master cylinders have been provided in hydraulic brake systems, the master cylinders being adapted to be operated by manually applied power to generate pressure in the hydraulic system and to thereby apply the brakes in the system. Additionally, known master cylinder constructions have ordinarily included a fluid reservoir for replenishing braking fluid in the system as it may be gradually lost in use. However, known master cylinder constructions are often complicated and expensive to construct and service, but in addition, are not readily "pumped up."

By "pumping up" is meant the ability to establish braking pressure by a series of quick in and out movements of the brake pedal or other operating means which will serve to replenish the fluid in the braking system from the master cylinder reservoir even though there is a leak in the hydraulic brake system. Some master cylinder constructions can be "pumped up" better than others, but so far as is known, none of the existing systems is entirely foolproof and satisfactory. For example, in one system for "pumping up" a master cylinder, mechanical means are used to disengage the sealing means between a piston and a cylinder near the end of the return stroke of the piston, and while such means operate reasonably satisfactorily, they are an additional item of cost and servicing in a master cylinder construction.

It is the general object of the invention to avoid and overcome the foregoing and other difficulties of and objections to known master cylinder constructions by the provision of a relatively inexpensive, easily serviced master cylinder which can be readily "pumped" to add braking fluid to a hydraulic brake system rapidly.

Another object of the invention is to provide an improved piston and cylinder combination wherein rubber O-ring sealing means are tightly in sealing position between the piston and cylinder during the pressure stroke of the piston, but with such seal means moving to non-sealing position in the "at rest" position of the piston.

Another object of the invention is to provide a piston and cylinder combination, either the piston or cylinder having a groove receiving a rubber O-ring, the side walls of the groove being formed with apertures therethrough to enhance fluid flow, the apertures in the sidewall of the groove being covered by the O-ring when it moves against that sidewall.

Another object of the invention is to provide a master cylinder construction wherein positive release of pressure is provided for without the use of a tilt pin or other mechanical devices.

Another object of the invention is to provide a master cylinder for use in a hydraulic brake system, the parts of the master cylinder having greater allowable tolerances and longer operating life.

The foregoing objects of the invention, and other objects which will become apparent as the description proceeds, are achieved by providing in combination, a cylinder, a piston slidably mounted in the cylinder, a rubber O-ring carried in a groove in the piston, one side of the groove having shelf means on which the O-ring rides in sealing relation between the piston and cylinder during the pressure stroke of the piston, the other side of the groove being cut away so that upon the return stroke of the piston the O-ring will roll to non-sealing position, the cylinder having a larger internal diameter adjacent the "at rest" position of the piston to provide greater clearance between the O-ring and cylinder wall. Usually, the sidewalls of the groove are formed with apertures therethrough in a direction substantially parallel to the axis of the piston to enhance fluid flow, the apertures in a sidewall being covered by the O-ring when it moves against that sidewall.

For a better understanding of the invention, reference should be had to the accompanying drawing, wherein:

Fig. 1 is a vertical, cross-sectional view through one typical master cylinder construction incorporating the principles of the invention;

Fig. 2 is an enlarged fragmentary view of the relation of the piston and cylinder in the "at rest" position;

Fig. 3 is a transverse, horizontal sectional view taken substantially on line III—III of Fig. 2; and Fig. 4 is a view similar to Fig. 3 but taken substantially on line IV—IV of Fig. 2.

In the drawing, the numeral 1 indicates generally a cylinder, usually but not necessarily positioned in a vertical direction, the lower end of the cylinder being closed by plug 2 which may be adapted for pivotal mounting, as by the provision of a pivot hole 3. A fitting 4 is welded or otherwise secured to the side of the cylinder 1 so as to surround an outlet 5 in the bottom of the cylinder, the fitting 4 being adapted to receive a conduit 6 indicated in chain dotted lines and extending to the hydraulic brake system. A fitting 7 is welded or otherwise secured to the upper end of the cylinder 1 so as to surround an inlet aperture 8 in the cylinder, the fitting being adapted to have secured thereto a conduit 9, indicated in chain dotted lines, and extending to a fluid reservoir 10, also indicated in chain dotted lines.

Slidably received in the cylinder 1 is a piston 11 to the upper end of which is attached a piston rod 12, the upper end of the piston rod having a clevice or other operating means 13 secured thereto. The piston rod 12 extends slidably through a gland nut 14 which may take the form illustrated, including a rubber O-ring 15 sealing between the piston rod and nut, and a second rubber O-ring 16 sealing between the gland nut 14 and the inside wall of the end of the cylinder.

The gland nut is conveniently locked in position by a snap ring 17 locking in a groove in the end of the cylinder wall. The gland nut 14 acts as a stop to limit the upward movement of the piston, and the piston is normally urged to its uppermost position by means of a coiled compression spring 18 which at its upper end is reduced slightly in diameter to surround a boss 19 on the lower end of the piston 11. A pin 20 limits the downward movement of the piston 11 in the cylinder.

The piston 11 is formed with a groove 21 in which is received a rubber O-ring 22. It will be seen that the width of the groove 21 is between about once and about twice the thickness of the O-ring 22. Actually, the grooves 21 is formed in the particular embodiment of the invention illustrated by collars 23 and 24 formed integral with or mounted on the piston 11. The bottom of the groove 21 adjacent the collar 23 is formed with a cylindrical seat or shelf 25 of an axial length between about one-half and about one times the thickness of the rubber O-ring 22, and of a diameter slightly greater than the inside diameter of the O-ring. Thus, upon the pressure stroke of the piston 11 the O-ring 22 will roll up on the cylindrical seat 25 and against the side wall of the collar 23, the rubber O-ring being held out against the inside wall of the cylinder 1 so that the O-ring will seal positively between the piston and the cylinder.

The bottom of the groove 21 lying between the collar 24 and the cylindrical portion 25 takes the form of a cutaway portion 26, usually of a taper blending into the cylindrical portion 25 so that upon the return stroke of the piston 11, the rubber O-ring 22 will roll off the cylindrical portion 25 and onto the cutaway portion 26 in which position the rubber O-ring will no longer have sealing engagement with the inside wall of the cylinder.

To assist in the rolling action of the rubber O-ring 22 as just described, preferably, but not necessarily, the collars 23 and 24 on the piston are formed with a plurality of circumferentially spaced apertures 27 and 28 respectively, these apertures being substantially parallel to the axis of the piston and positioned, as illustrated in Figs. 2, 3, and 4, so that when the rubber O-ring rolls adjacent the collar, the apertures in the collar will be substantially covered by the O-ring. As noted, the apertures 27 and 28 tend to enhance the flow of fluid against the rubber O-ring without objectionably reducing the over-all diameters of the collars, and this feature of the invention is applicable to O-ring seals of all types.

In order to further enhance the "pump-up" characteristics of the master cylinder illustrated and described, the inside of the cylinder 1 is counterbored or otherwise slightly increased in diameter near the "at rest" position, or uppermost position, of the piston. To this end, Fig. 2 of the drawings indicates at 29 the normal bore or internal surface of the cylinder 1, and the numeral 30 indicates the inner surface of the counterbore or larger diameter portion of the cylinder. The surfaces 29 and 30 are usually joined by a tapered or truncated conical surface 31. The axial position of the surfaces 29, 30, and 31 of the inside of the cylinder bears substantially the relation shown in Fig. 2 with the piston in its "at rest" position. In this manner, a greater clearance is provided between the piston and the cylinder in the "at rest" position of the piston, and this allows the master cylinder as a unit to function in a particularly efficient and satisfactory manner during the "pumping up" of the master cylinder.

It will be noted that the increase in diameter of the cylinder adjacent the "at rest" position of the piston is relatively slight, this increase in diameter being usually less than one-half of the thickness of the O-ring, and ordinarily nearer to ¼ or less of the thickness of the O-ring.

From the foregoing, it will be recognized that the various objects of the invention have been achieved by the provision of a relatively simple, inexpensive, readily produced and serviced master cylinder construction possessing particular excellent "pumping up" characteristics. No mechanical means are required to facilitate unsealing between the piston and cylinder upon the movement of the piston to its "at rest" position. Tolerances of the assembly are not critical and the assembly will operate over long periods without attention or repair.

While in accord with the patent statutes, one particular embodiment of the invention has been illustrated and described in detail, it is to be particularly understood that the invention is not limited thereto or thereby, but that the scope of the invention is defined in the appended claims.

What is claimed is:

1. A master cylinder for hydraulic brakes, and the like including a vertically positioned cylinder, a piston slidably received in the cylinder, a compression spring in the cylinder for returning the piston to its at rest position, a gland nut for limiting the return movement of the piston, a rubber O-ring on the piston, a pair of collars on the piston spaced apart axially of each other a distance between about once and about twice the thickness of the O-ring which is carried between them, said piston having a substantially cylindrical portion of a diameter slightly greater than the inside of the O-ring and a length between about one-half and about once the thickness of the O-ring adjacent the collar remote from the piston end contacted by the spring, said O-ring moving onto the cylindrical portion during the pressure stroke of the piston to seal between the piston and cylinder, the remainder of the space between the collars being cut away on a taper from the cylindrical portion to a diameter less than the inside diameter of the O-ring, each collar having a plurality of apertures therethrough, which apertures are positioned a radial distance from the axis of the piston which is less than the radial distance between the piston axis and the portion of the O-ring contacting the collar, said cylinder having a counterbore adjacent the at rest position of the piston for establishing greater clearance between the O-ring and the cylinder wall when the piston is at rest position.

2. A master cylinder for hydraulic brakes, and the like, including a vertically positioned cylinder, a piston slidably received in the cylinder, a compression spring in the cylinder for returning the piston to its at rest position, a gland nut for limiting the return movement of the piston, a rubber O-ring on the piston, a pair of collars on the piston spaced apart axially of each other a distance between about once and about twice the thickness of the O-ring which is carried between them, said piston having a substantially cylindrical portion of a diameter slightly greater than the inside of the O-ring and a length between about one-half and about once the thickness of the O-ring adjacent the collar remote from the piston end contacted by the spring, said O-ring moving onto the cylindrical portion during the pressure stroke of the piston to seal between the piston and cylinder, the remainder of the space between the collars being cut away on a taper from the cylindrical portion to a diameter less than the inside diameter of the O-ring, said cylinder having a counterbore adjacent the at rest position of the piston for establishing greater clearance between the O-ring and the cylinder wall when the piston is at rest position.

3. A master cylinder for hydraulic brakes, and the like, including a vertically positioned cylinder, a piston slidably received in the cylinder, a compression spring in the cylinder for returning the piston to its at rest position, a gland nut for limiting the return movement of the piston, a rubber O-ring on the piston, a pair of collars on the piston spaced apart axially of each other a distance between about once and about twice the thickness of the O-ring which is carried between them, said piston having a substantially cylindrical portion of a diameter slightly greater than the inside of the O-ring and a length between about one-half and about once the thickness of the O-ring adjacent the collar remote from the piston end contacted by the spring, said O-ring moving onto the cylindrical portion during the pressure stroke of the piston to seal between the piston and cylinder, the remainder of the space between the collars being cut away on a taper from the cylindrical portion to a diameter less than the inside diameter of the O-ring, each collar having a plurality of apertures therethrough, which apertures are positioned a radial distance from the axis of the piston which is less than the radial distance between the piston axis and the portion of the O-ring contacting the collar.

4. A master cylinder for hydraulic brakes, and the like, including means for limiting the return movement of the piston, a rubber O-ring on the piston, a pair of collars on the piston spaced apart axially of each other a distance between about once and about twice the thickness of the O-ring which is carried between them, said piston having a substantially cylindrical portion of a diameter slightly greater than the inside of the O-ring and a length at least about one half the thickness of the O-ring adjacent the collar remote from the piston end contacted by the spring, said O-ring moving onto the cylindrical portion during the pressure stroke of the piston to seal between the piston and cylinder, the remainder of the space between the collars being cut away from the cylindrical portion to a diameter less than the inside diameter of the O-ring, each collar having a plurality of apertures therethrough which apertures are positioned a radial distance from the axis of the piston which is less than the radial distance between the piston axis and the portion of the O-ring contacting the collar, said cylinder having a counterbore adjacent the at rest position of the piston for establishing greater clearance between the O-ring and the cylinder wall when the piston is at rest position.

5. A master cylinder for hydraulic brakes, and the like, including means for limiting the return movement of the piston, a rubber O-ring on the piston, a pair of collars on the piston spaced apart axially of each other a distance between about once and about twice the thickness of the O-ring which is carried between them, said piston having a substantially cylindrical portion of a diameter slightly greater than the inside of the O-ring and a length at least about one-half the thickness of the O-ring adjacent the collar remote from the piston end contacted by the spring, said O-ring moving onto the cylindrical portion during the pressure stroke of the piston to seal between the piston and cylinder, the remainder of the space between the collars being cut away from the cylindrical portion to a diameter less than the inside diameter of the O-ring, said cylinder having a counterbore adjacent the at rest position of the piston for establishing greater clearance between the O-ring and the cylinder wall when the piston is at rest position.

6. A master cylinder for hydraulic brakes, and the like, including a means for limiting the return movement of the piston, a rubber O-ring on the piston, a pair of collars on the piston spaced apart axially of each other a distance between about once and about twice the thickness of the O-ring which is carried between them, said piston having a substantially cylindrical portion of a diameter slightly greater than the inside of the O-ring and a length at least about one-half the thickness of the O-ring adjacent the collar remote from the piston end contacted by the spring, said O-ring moving onto the cylindrical portion during the pressure stroke of the piston to seal between the piston and cylinder, the remainder of the space between the collars being cut away from the cylindrical portion to a diameter less than the inside diameter of the O-ring, each collar having a plurality of apertures therethrough which apertures are positioned a radial distance from the axis of the piston which is less than the radial distance between the piston axis and the portion of the O-ring contacting the collar.

7. In combination a cylinder, a piston slidably mounted in the cylinder, a rubber O-ring carried in a groove in the piston, one side of the groove having shelf means on which the O-ring rides in sealing relation between the piston and cylinder during the pressure stroke of the piston, the other side of the groove being cut away so that upon the return stroke of the piston the O-ring will roll to non-sealing position, said cylinder having a larger internal diameter adjacent the at rest position of the piston to provide greater clearance between the O-ring and the cylinder wall, the side walls of the groove being formed with apertures therethrough in a direction substantially parallel to the axis of the piston to enhance fluid flow, the apertures in a side wall being covered by the O-ring when it moves against that side wall.

8. In combination a cylinder, a piston slidably mounted in the cylinder, a rubber O-ring carried in a groove in the piston, one side of the groove having shelf means on which the O-ring rides in sealing relation between the piston and cylinder during the pressure stroke of the piston, the other side of the groove being cut away so that upon the return stroke of the piston the O-ring will roll to non-sealing position, the side walls of the groove being formed with apertures therethrough in a direction substantially parallel to the axis of the piston to enhance fluid flow, the apertures in a side wall being covered by the O-ring when it moves against that side wall.

9. In combination a cylinder, a piston slidably mounted in the cylinder, a rubber O-ring carried in a groove in the piston, the side walls of the groove being formed with apertures therethrough in a direction substantially parallel to the axis of the piston and with the apertures being substantially in axial alignment with each other to enhance fluid flow, the apertures in a side wall being covered by the O-ring when it moves against that side wall.

CLIFTON A. BYERS.
PAUL C. CLUGH.

REFERENCES CITED

The following references are of record in the file of this patent:

UNITED STATES PATENTS

| Number | Name | Date |
|---|---|---|
| 2,352,920 | Stevens | July 4, 1944 |
| 2,377,017 | Lacoe | May 29, 1945 |
| 2,396,155 | Christensen | Mar. 5, 1946 |
| 2,500,502 | Vogel | Mar. 14, 1950 |